United States Patent [19]

Marbet

[11] Patent Number: 4,649,231

[45] Date of Patent: Mar. 10, 1987

[54] METHOD FOR THE TRANSMISSION OF CHARACTERS BY MEANS OF THE CODE COMBINATIONS OF A TELEGRAPH ALPHABET

[75] Inventor: Hans Marbet, Mattstetten, Switzerland

[73] Assignee: Hasler AG Bern, Bern, Switzerland

[21] Appl. No.: 698,245

[22] Filed: Feb. 5, 1985

[30] Foreign Application Priority Data

Feb. 10, 1984 [CH] Switzerland .......................... 649/84

[51] Int. Cl.$^4$ ...................... H04L 17/00; H04L 15/00
[52] U.S. Cl. ...................................... 178/2 B; 178/79; 400/174; 400/70; 340/365 VL

[58] Field of Search .................. 178/2 B, 26 A, 71 L, 178/79, 89, 3, 113, 1; 340/365 VL; 400/61, 76, 72, 174, 175, 63, 70

[56] References Cited

U.S. PATENT DOCUMENTS 3,480,729 11/1969 Stürzinger .............................. 178/79

Primary Examiner—Stafford D. Schreyer
Attorney, Agent, or Firm—Horst M. Kasper

[57] ABSTRACT

It is an object of the present invention to provide a teleprinting machine capable of transmitting and writing capital and small letters, where the number of additionally transmitted shift code combinations is minimized in order to reduce the transmission time in this fashion.

13 Claims, 3 Drawing Figures

| Codewords | Lower case letters | Numerals, special characters | Upper case letters | Numerals, special characters |
|---|---|---|---|---|
| 1 1 0 0 0<br>1 0 0 1 1<br>0 1 1 1 0<br>1 0 0 1 0<br>1 0 0 0 0<br>1 0 1 1 0<br>0 1 0 1 1<br>0 0 1 0 1<br>0 1 1 0 0 | a<br>b<br>c<br>d<br>e<br>f<br>g<br>h<br>i  }15 | -<br>?<br>:<br>.<br>✚<br>3<br>ü<br>ö<br>ä<br>8  }17 | A<br>B<br>C<br>D<br>E<br>F<br>G<br>H<br>I  }19 | -<br>?<br>:<br>.<br>✚<br>3<br>Ü<br>Ö<br>Ä<br>8  }21 |
| 0 0 0 1 0<br>0 1 0 0 0 | Carriage return<br>Line feed | | | |
| 1 1 0 1 1<br>1 1 1 1 1 | Special character switching<br>Letter character switching | | | |

FIG. 1

| Switching Codeword | Switching from character set | Switching to character set |
|---|---|---|
| 30 [11011] | 15<br>or 19 | 17<br>21 |
| 31 [11111] | 15<br>or 17<br>or 19<br>or 21 | 19 for individual upper case<br>15 letters<br>15<br>19 |
| 30 [11011] + 31 [11111] | 15 | 19 for a sequence of upper case letters |
| 31 [11111] + 31 [11111] | 15 | 15 |
| 31 [11111] + 30 [11011] | 15 | 17 |

FIG. 3

METHOD FOR THE TRANSMISSION OF CHARACTERS BY MEANS OF THE CODE COMBINATIONS OF A TELEGRAPH ALPHABET

BACKGROUND OF THE INVENTION

1. Field of the Invention

The present invention relates to a method for the transmission of characters by means of the code combinations of a telegraph alphabet, particularly of the International Telegraph Alphabet No. 2 (ITA No. 2) where the characters are coordinated in a single or a multiple way to code combinations, such that the complete set of code combinations corresponds at least to a set of small letters, to a set of capital letters and to a set of digits, punctuations marks and special characters.

2. Brief Description of the Background of the Invention Including Prior Art

The International Telegraph Alphabet (ITA) No. 2 has been introduced by the international standard organization CCITT for use on international telegraph networks. This alphabet employs signal frames for transmission which comprise a start step, a five unit step group and a stop step. With the aid of the five units of the five unit step groups, thirty-two different combinations can be formed which represent a set of a corresponding number of code combinations.

On the one hand, the latin alphabet, that is, a set of letters, also called letters set, and on the other hand a set of digits, punctuation marks and special characters called figures set, are coordinated to this set of code combinations. In order to change from the letters set to the figures set, one of the code combinations is employed as the figure shift code combination and for the reverse change coorespondingly a letter shift code combination is employed. In the case of a multiple transmission of these shift code combinations no further effect is generated at the receiver.

Older teleprinting machines which employ the International Telegraph Alphabet No. 2 are provided with a keyboard where each key is coordinated both to the figures set and to the letters set. The change from one set to the other set is in each case performed by actuating of a shift key, whereby the corresponding shift code combination is emitted onto the transmission circuit. More recent teleprinting machines are frequently provided with a so-called full keyboard which comprises both a set of letter keys and a set of figure keys. Further more, in most cases one or several switching keys are provided for selection of less frequently used characters as the second meaning of the keys. In the case of such a full keyboard, transmission of a corresponding shift code combination is provided automatically for every shift from one set to another.

A teleprinting machine is known from the German Patent Application No. DE-2,640,848 which exhibits both a set of capital letters and a set of small letters. Single capital letters are called by actuation of a switching key capital/small letters. Thereby, immediately before transmission of the code combination of the letter to be transmitted a letter shift code combination is transmitted. The receiver recognizes this letter shift code combinations, switches to the set of capital letters, prints the letter transmitted as a capital letter and switches back to the set of small letters. In this way a correct capital/small letters writing is achieved with this teleprinting machine.

A further teleprinting machine is known from the European Patent Application No. EP 85936, where a set of command words is employed for shifting between up to four sets of characters. The command words are formed either from a single shift code combination or from a combination of two shift code combinations. By this all code combinations succeeding a command word are coordinated to one set of the characters until another command word follows.

The joint feature of both said teleprinting machines is the possiblility of writing in capital and small letters. In both cases the multiple transmission of the shift code combinations otherwise normally being without effect according to the International Telegraph Alphabet ITA No. 2 is used for the transmission of additional shift information. However, in both cases a full compatibility with such teleprinting machines, which can process only the conventional two sets of characters, is assured. Finally, each of the two teleprinting maschines requires additional time for transmission of texts because of the additional shift code combinations to be transmitted, which time can be considerable depending on the kind of text.

SUMMARY OF THE INVENTION

It is an object of the present invention to provide a teleprinting machine capable of transmitting and writing capital and small letters, where the number of additionally transmitted shift code combinations is minimized in order to reduce the transmission time in this fashion. It is another object of the invention to provide a minimization of the number of code signals transmitted, which is independent of the kind of the textual material to be transmitted. It is a further object of the present invention to provide a method for the transmission of characters by means of the code combinations of a telegraph alphabet, especially the International Telegraph Alphabet No. 2, which effectively allows the transmission of capital as well as small letters.

These and other objects and advantages of the present invention will become evident from the description which follows.

The novel features which are considered as characteristic for the invention are set forth in the appended claims. The invention itself, however, both as to its construction and its method of transmission, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 is a table showing part of the International Telegraph Alphabet No. 2,

FIG. 3 is a table for the coordination of the shift code combinations.

DESCRIPTION OF THE INVENTION AND THE PREFERRED EMBODIMENT

Figure 2:
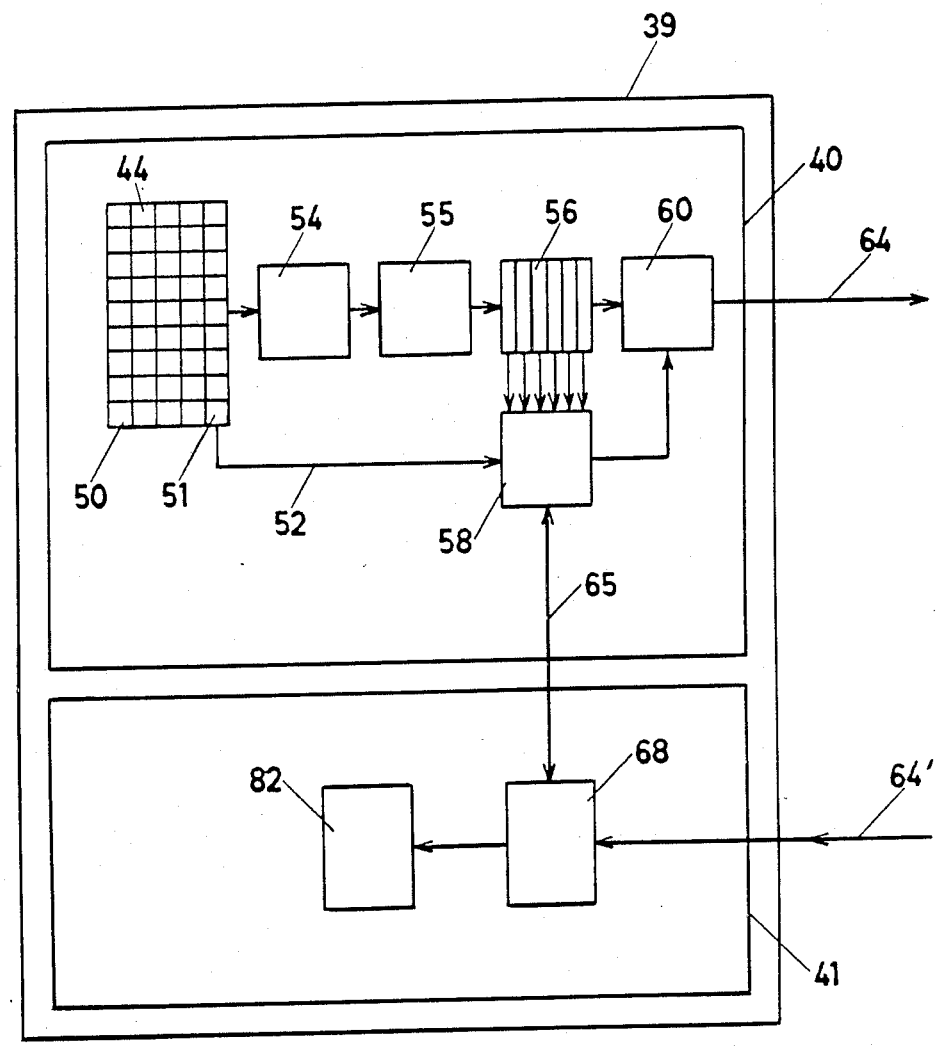
FIG. 2 is a block circuit diagram of a teleprinting machine.

In accordance with the present invention, there is provided a method for the transmission of characters by means of code combinations of a telegraph alphabet, in particular of the International Telegraph Alphabet No.

2 (ITA No. 2), where the characters are coordinated in a single and multiple way to code combinations 12, such that the complete set of code combinations 12, 13, 14 corresponds at least to a set of small letters 15, to a set of capital letters 19 and to a set of digits, punctuation marks and special characters 17, where the coordination of the character code combinations 12 to the sets of characters 15, 17, 19 is based in each case on the choice of previously transmitted shift code combinations 30,31, comprising, that the coordination of the code combinations 12 to the set of capital letters 19 is achieved in two ways, depending on whether singles or sequences of characters of this set 19 shall be transmitted, and where this sequences may be interjected by characters of the set of digits, punctuation marks and special characters 17 and/or control characters (e.g. Carriage return).

Referring now to FIG. 1, there is shown by way of a table and in part, the International Telegraph Alphabet No. 2. The left column shows the employed five unit step groups or, respectively code combinations 12, 13, 14 in a list. The following columns show the coordinated sets of small letters 15, of digits, punctuation marks and small umlaut letters (first set of figures) 17, of capital letters 19 and of digits, punctuation marks and capital umlaut letters (second set of figures) 21.

The coordination is performed line by line. The group 12 of the character code combinations is indicated in the upper part of the table. Then the group 13 of the control code combinations follows, of which the code signals for carriage return and line feed are indicated. At the very bottom is shown the group 14 of the shift code combinations. This group comprises only the figure shift code combination 30 and the letter shift code combination 31.

Referring now to FIG. 2, there is shown the block circuit diagram of a teleprinting machine 39 with a transmitter 40 and a receiver 41. The machine 39 is coupled to a second teleprinting machine not shown here via a transmission line 64 and a receiving line 64'. The coupling is such that the transmitters and the receivers cooperate in pairs by means of the International Telegraph Alphabet No. 2. The transmitter 40 is connected internally to the receiver 41 via a link 65.

The transmitter 40 comprises a keyboard 44 for entering letters, digits and punctuation marks with preferably a separate key for each. The keyboard 44 comprises further keys for the selection of characters having a second meaning for said separate keys. Thus, e.g. the key 50 serves for the short time shift from small letters to capital letters and the key 51 serves for the continuous shift to capital letters for a general writing with capital letters.

A coder 54 is coordinated to the keyboard 44 which provides for each selected or, respectively, entered character an internal code word of for example seven bits, characterizing the character completely. The internal code words in the sequence of their generation enter a memory storage 55, which is organized preferably in the sense of a first-in-first-out memory. The reading out of the stored internal code words can be performed simultaneously with the reading in or separated in time.

During reading out of the internal code words from the memory storage 55, the internal code words pass via a surveillance memory 56, which is supervised by a logic 58 to detect if the internal code words contained uniquely belong to a single set of characters 15, 17, 19 or 21 or if one or several changes from one set of characters to another set occur and how many characters are disposed between these changes.

Based on this surveillance the logic 58 controls a code converter 60 which sequentially converts the internal seven bit code words into the five unit code combinations 12 or, respectively 13 of the Telegraph Alphabet. In the case of a change from one set of characters to another set of characters, shift code combinations 30, 31 are inserted into the flow of the code combinations to be transmitted. The code combinations 12, 13, 14 are then transmitted onto the transmission line 64 clocked by the transmitter 40 or by this transmission line.

A decoder 68 of the receiver 41 converts the arriving code combinations 12, 13 into internal code words (for example, seven bit). To these internal code words is added information as to which set of characters 15, 17, 19, 21 the coordinated character belongs to. The logic 68 takes this information from the arriving shift code combinations 30, 31 in distinguishing during decoding if the shift code combinations arrive individually, followed by at least one arbitrary character code combination 12 or control code combination 13, or if they arrive as pairs in immediate sequence.

A suitable printing device 82, for example a matrix printer, then prints the received characters. The teleprinting machine 39 transmits onto the lines 64 and receives from the line 64' exclusively permitted code combinations 12, 13, 14.

The employment of the switching code combinations 30, 31 is shown in FIG. 3. The figure shift code combination 30 shifts to one of the two sets of FIGS. 17 or 21, depending on which set of letters (15 or 19) the previous code combination 12 belongs to. The letter shift code combination 31 vice versa shifts from the sets of FIGS. 17, 21 to the set of small letters 15 or to the set of capital letters 19, respectively.

Further a single shift code combination 31 shifts from the set of small letters 15 to the set of capital letters 19 for exclusively single capital letters. In this case both in the logic 58 of the transmitter 40 and in the decoder 68 of the receiver 41 immediately upon transcoding of the said letter a reshift to the set of the small letters 15 takes place. Finally the letter shift code combination 31 succeeding a sequence of capital letters shifts from the set of capital letters 19 to the set of small letters 15.

The combination of two contiguous shift code combinations 30 plus 31 shifts from the set of small letters 15 to the set of capital letters 19, in fact exclusively for the purpose of a sequence of several capital letters.

The sequence of two or more contiguous letter shift code combinations 31, occurring for example with over-punching for the purpose of error correction in the case of a five-channel punched paper tape, remains without effect if the previous characters were small letters.

In the case of over-punching for correcting of figures one or several of the resulting letter shift code combinations 31 plus a following figure shift code combination 30 shifts back to one of the sets of FIGS. 17 or 21.

The knowledge of whether a single capital letter or a sequence of several capital letters is to be transmitted and printed out gathers the logic 58 from the surveillance memory 56. This surveillance memory 56 contains for example the six internal code words or, respectively, characters to be transmitted next. If some of these code words represent single letters then ahead of each of these capital letters a letter shift code combinations 31 is transmitted corresponding to the said instruction. If in contrast the logic circuit 58 recognizes a sequence of several contiguous capital letters then ahead of the first of these capital letters the combination of the figure shift code combination 30 plus immediately following the letters shift code combination 31 are inserted for emission onto the transmission line 64. If several capital letters are separated by figures, spaces or control characters, such as for example carriage return, then they are considered as contiguous capital letters. The criterium for "single capital letters" thus is provided by single small letters or sequences of several small letters separating the capital letters.

It follows from the kind of application of the use of the shift code combinations 30 and 31 that in the case of one or two contiguous capital letters either one or over all two shift code combinations 31 are required. In the case of four or more contiguous capital letters, two plus one (for the shift to the small letters) shift code combinations 30 and 31 are required.

In the case of three contiguous capital letters, independent from the instructions three shift code combinations are required. Thus this is the limit for "single" capital letters and for a "sequence" of capital letters. Based on the looking ahead mode of operation of the logic 58 in connection with the surveillance memory 56, results a minimization of the number of shift code combinations 30 and 31 to be transmitted for arbitrary sequences of small and capital letters, that is, independent of the kind of text to be transmitted.

If during a dialogue communication between the teleprinting machine 39 and the partner machine connected via the lines 64, 64', the surveillance memory 56 is not completely filled, then the logic 58 cannot decide in the manner described if the following internal code words are single capital letters or if they are members of a sequence of capital letters. In this case it is communicated via a line 52 to the logic 58 if the key 51 is actuated for permanent switching to capital letters or not. If this key is in operational position then this shows the intent that the following characters will be capital letters. The logic 58 expects in this case a sequence of several capital letters.

The use of two sets of FIGS. 17 and 21 supports the minimization of the required shift code combinations 30, 31, since independent of whether or not the small letters or the capital letters are mixed with digits, punctuation marks and special letters there is performed a shift in each case with only one single shift code combination. Only for the transmission of small and capital umlaut letters more than one shift code combination 30, 31 may be required leading via intermediate shifts to the proper set of FIGS. 17 or 21.

The described teleprinting machine 39 is simple in its construction and fully compatible with all conventional teleprinting machines. It allows transmission and print out of small and capital letters with a minimum of shift code combinations 30, 31. When receiving texts being transmitted from a five channel punched paper tape with corrections, that is from a punched tape with punched-over sequences equal to the letter shift code combination 31, then the receiver 41 prints out the received text fully readable. If the punched paper tape contains a single punching-over then "erroneously" one capital letter is printed out instead of a small letter. In the case of several contiguous punching-overs however no error is generated in the printout.

The following variations may be provided:

The apparatus for transmission of characters by means of code combinations may comprise two teleprinting machines, may comprise a pure transmitter and a pure receiver, may comprise a transmitter-receiver for half duplex and for full duplex operation and so on. In particular in the case of half duplex operation, the link 65 is required for the internal exchange of information between the transmitter 40 and the receiver 41.

The concept "teleprinting machine" has to be interpreted as wide ranging and can for example be a text editing or, respectively a text processing provision, which may be adapted to the situations of the ITA no. 2.

Instead of employing of ITA no. 2, the described method can also be employed with every other telegraph alphabet which employs shift code combinations.

The keyboard 44 contains means for selectively choosing in series the characters to be transmitted in the widest sense of the word. It can thus be formed in any desirable way. The same holds for the printing device 82 for printing or displaying the received characters in a desired way. Thus a printing device 82 may be also e.g. a video screen display.

The decision means for the "looking ahead" distinction of single capital letters from sequences of capital letters to be transmitted can be performed in various ways. In particular, the surveillance memory 56 can be provided as a separate storage means, for example as a shift register, or as a partial memory storage of the generally larger text memory storage 55. The limits of the storage region accessible for surveillance has to comprise at least three internal code words. However, it can be as large as desired and can even comprise the complete memory storage 55, 56.

It will be understood that each of the elements described above, or two or more together, may also find a useful application in other types of transmission for characters differing from the types described above.

While the invention has been illustrated and described as embodied in the context of a method for the transmission of characters by means of the code combinations of a telegraph alphabet, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for the transmission of characters by means of the code combinations of a telegraph alphabet, particularly of the International Telegraph Alphabet No. 2,
where the characters are coordinated in a single or multiple way to code combinations (12), such that a complete set of code combinations (12, 13, 14) corresponds at least to a set of small letters (15), to a set of capital letters (19) and to a set of digits, punctuation marks and special characters (17),
where a coordination of the character code combinations (12) to the sets of characters (15, 17, 19) is based in each case on the choice of previously transmitted shift code combinations (30, 31), comprising, that the coordination of the code combinations (12) to the set of capital letters (19) is achieved in two ways, depending on whether singles or sequences of characters of this set (19) shall be transmitted, and where the sequences may be interjected by characters of the set of digits, punctuation marks and special characters (17) and/or control characters (e.g. Carriage return).

2. A method according to claim 1, comprising
that the decision on whether the capital letters (19) eventually occuring within a stream of characters to be sent are in singles or whether they appear as compact sequences takes place in advance of the transmission of the corresponding code combinations (12, 13),
that where a sequence of capital letters follows a small letter, the corresponding change of the coordination of the code combinations from the set of small letters (15) to the set of capital letters (19) is initiated by a combination of a figure-shift code combination (30) and a contiguously following letter-shift code combination (31), and
that where a single capital letter follows a small letter, the corresponding change of coordination of code combinations from the set of small letters (15) to the set of capital letters (19) is initiated by a single letter-shift code combination (31).

3. A method according to claim 1, comprising,
that a sequence of letter-shift code combinations (31) following a character of the set of small letters (15) does not change the coordination to another set of characters (17, 19).

4. A method according to claim 1, comprising,
that a second set of digits, punctuation marks and special characters (21) is provided, where one of the sets of characters (17) is related with the set of small letters (15) and the other (21) with the set of capital letters (19),
that for any change from one of the letter sets (15 or 19) to the corresponding related set of digits, punctuation marks and special characters (17 or 21 respectively) the coordination change is initiated by a figure-shift code combination (30), and
that vice-versa the opposite change is initiated by a single letter-shift code combination (31).

5. A method according to claim 1, comprising,
that for the return from the set of capital letters (19) to the set of small letters (15) the coordination change is initated by a single letter-shift code combination (31).

6. Apparatus which applies the method according to claim 1,
where at least a transmitter (40) is provided, containing selection means (44) for the input of the alphabetic and control characters, a memory storage (55) for their intermediate storage before they are transmitted as character (12) or control code combinations (13) and a logic device (58) for the selection of the shift code combinations (30, 31) in addition to be transmitted and initiating the changes between any two character sets (15, 17, 19),
and where at least a receiver (41) is provided, containing a decoding device (68) for the received code combinations (12, 13, 14) and for the coordination of each of the code combinations (12) to one of the character sets (15, 17, 19) as based on the previously received shift code combinations (30, 31), and output means (82) for the display or printing of the received characters,
the transmitter comprising
decision devices which decide if any characters of the set of capital letters (19) are contained in the stream of the characters to be transmitted and whether they are singles or appear in sequences, where a sequence may be interjected with characters of the set of digits, punctuation marks and special characters (17) and/or with control characters (e.g. Carriage return) such
that a logic device (58), depending on the decision taken by the decision device, eventually inserts either a single letter-shift code combination (31) or a single figure-shift code combination (30) contiguously followed by a single letter-shift code combination (31) to be transmitted in advance to the single or sequence respectively of capital letters,
and the receiver (41) comprising
the provision of a decision device (68) for the distinction of singles and groups of contiguous shift code combinations (30, 31) both being followed by arbitrary code combinations (12, 13), and
that the decision device (68) can distinguish the various groups of shift code combinations (30, 31).

7. Apparatus according to claim 6, comprising
that the decision device consists of a supervisory memory storage (56) and a logic device (58), such that the logic device supervises the whole contents of the supervisory memory storage (56) that is the contents of a limitted number of characters next to be transmitted and that it checks their coordination to the various character sets (15, 17, 21).

8. Apparatus according to claim 6, comprising
a key (51) on the keyboard (44) which serves as the decision device, on operation of which general writing in capital letters takes place.

9. Apparatus according to claim 6, comprising
a supervisory memory storage (56) as a integral memory area of the memory storage (55).

10. A method for the transmission of characters by means of the code combinations of a telegraph alphabet, particularly of the International Telegraph Alphabet No. 2,
where the characters are coordinated in a single or multiple way to code combinations (12), such that a complete set of code combinations (12, 13, 14) corresponds at least to a set of small letters (15), to a set of capital letters (19) and to a set of digits, punctuation marks and special characters (17),
where a coordination of the character code combinations (12) to the sets of characters (15, 17, 19) is based in each case on the choice of previously transmitted shift code combinations (30, 31), comprising,
that an investigation is undertaken prior to the emission of a code combination (12) for a capital letter (A, B, C, D, . . . ), if this capital letter (A, B, C, D, . . . ) occurs individually or in a sequence of several capital letters in the sequence of characters (capital letters, lower case letters, numerals, marks and special characters), where this sequence of capital letters can be interrupted by characters of the set of numerals and/or punctuation marks and special characters (17) and/or control characters (e.g. carriage return), and
that starting with the set of lower case characters (15) a letter switching code word (31) is emitted preceding to the emission of a punctuation mark or special character code word (12) for an individually placed capital letter and that a combination of a numeral switching code word (30) plus a directly following letter switching code word (31) is emitted preceding to the emission of a sequence of several capital letters (A, B, C, D, ... ).

11. The method according to claim 10 wherein the characters (capital letters, lower case letters, numerals, punctuation marks and special characters) are coordinated to character code words (12) such that a set of capital letters (19), a set of lower case letters, and two sets of numerals and/or punctuation marks and/or special characters (17, 21) are coordinated to the set of all code words (12, 13, 14), comprising that it is investigated prior to the emission of a punctuation mark and/or special character code word (12) if this character belongs to the same character set (15, 17, 19, 21) as the character emitted immediately prior to this emission or not, and as a result, a numeral switching code word (30), is emitted if the preceding emitted character belongs to the set of lower case characters (15) or to the capital letters and if the character to be emitted belongs to a first set (17) or to a second set of punctuation marks and/or special characters, a letter switching codeword (31), is emitted if the precedingly emitted character belongs to the set of lower case letters (15), to the first set of punctuation marks and/or special characters (17), to the set of capital letters (19) or to the second set of punctuation marks and/or special characters (21), and if the character to be emitted is a single letter, which belongs to the set of lower case letters (15) or, respectively, in the latter case to the set of capital letters (19), a combination of a numeral switching code word (30) plus a letter switching code word (31), is emitted if the preceding emitted character belongs to the set of lower case characters (15) and the character to be emitted belongs to a sequence of capital letters, and a combination of a letter switching code word (31) plus a numeral switching code word (30), is emitted if the precedingly emitted character belongs to the set of capital letters (19) and the character to be emitted belongs to the set of punctuation marks and/or special characters (17) (FIG. 3).

12. A method for the transmission of characters (capital letters, small letters, digits, punctuation marks) by means of the code combinations (12, 13, 14) of a telegraph alphabet, particularly of the International Telegraph Alphabet No. 2.

where the characters are coordinated in a single or multiple way to character code combinations (12), such that the complete set of code combinations (12, 13, 14) corresponds at least to one set of small letters (15), to one set of capital letters (19) and to one set of digits and punctuation marks (17),
where a coordination of the character code combinations (12) to the sets of characters (15, 17, 19) is based in each case on the choice of previously transmitted shift code combinations (30, 31), comprising that an investigation in undertaken prior to the emission of a character code combination (12) for a capital letter, whether in the sequence of characters this capital letter is placed individually or in a sequence of several capital letters, where this sequence of capital letters can be interrupted by characters of the set of digits and punctuation marks (17) and/or by control characters (e.g. carriage return), and that starting with the set of small letters (15) a single letters shift code combination (31) is emitted preceding to the emission of a character code combination (12) for an individually placed capital letter and that a combination of a figure shift code combination (30) plus a contiguously following letter shift code combination (31) is emitted preceding to the emission of a sequence of several capital letters.

13. The method according to claim 12 wherein the characters (capital letters, small letters, digits, punctuation marks) are coordinated to character code combinations (12) such that one set of capital letters (19), one set of small letters (15) and two sets of digits and punctuation marks (17, 21) are coordinated to the complete set of code combinations (12, 13, 14), comprising that an investigation is undertaken prior to the emission of a character code combination (12) for any character, whether this character belongs to the same set of characters (15, 17, 19, 21) as the character emitted immediately prior to this emission or not, that if it belongs not, prior to the emission of the character code combination (12) for the said character at least one shift code combination (30, 31) is emitted, being a figure shift code combination (30), if the precedingly emitted character belonged to the set of small letters (15) or to the set of capital letters (19) and if the character to be emitted belongs to the first set (17) or to the second set of digits and punctuation marks (21)

a letter shift code combination (31), if the precedingly emitted character belongs to the set of small letters (15), to the first set of digits and punctuation marks (17), to the set of capital letters (19) or to the second set of digits and punctuation marks (21), and if the character to be emitted is a single letter, which belongs to the set of small letters (15) or, respectively, in the latter case belongs to the set of capital letters (19), a combination of a figure shift code combination (30) plus a letter shift code combination (31), if the precedingly emitted character belonged to the set of small letters (15) and the character to be emitted belongs to a sequence of capital letters, and a combination of a letter shift code combination (31) plus a figure shift code combination (30), if the precedingly emitted character belonged to the set of capital letters (19) and the character to be emitted belongs to the first set of digits and punctuation marks (17).

* * * * *